United States Patent

Vrionis et al.

[11] Patent Number: 6,133,699
[45] Date of Patent: Oct. 17, 2000

[54] METHOD AND APPARATUS FOR OPERATING A PLURALITY OF MOTORS WITH A SINGLE CONTROLLER

[75] Inventors: Nick G. Vrionis, Los Altos; Robert M. Russ, Los Altos Hill; Dave Blau, Cupertino; Leland M. Farrer, Morgan Hill, all of Calif.

[73] Assignee: Gas Research Institute, Chicago, Ill.

[21] Appl. No.: 08/733,532

[22] Filed: Oct. 18, 1996

Related U.S. Application Data

[60] Provisional application No. 60/010,274, Jan. 19, 1996.

[51] Int. Cl.⁷ ...................................................... G10D 3/00
[52] U.S. Cl. .............................................................. 318/34
[58] Field of Search ................................. 318/34, 39, 35, 318/37, 46, 101, 51, 66, 67, 68, 103, 77, 78, 82, 85, 84, 99, 100; 307/11, 31, 32, 33; 110/185, 186, 188, 147, 162

[56] References Cited

U.S. PATENT DOCUMENTS

| | | | |
|---|---|---|---|
| 3,621,350 | 11/1971 | Masterman | 318/171 |
| 4,142,828 | 3/1979 | Tsudhima et al. | 415/201 |
| 4,196,376 | 4/1980 | Harvest et al. | 318/78 |
| 4,663,536 | 5/1987 | Roesel, Jr. et al. | 290/7 |
| 4,770,340 | 9/1988 | Takata | 236/14 |
| 4,825,131 | 4/1989 | Nozaki et al. | 318/52 |
| 4,879,475 | 11/1989 | Ruge et al. | 307/68 |
| 4,939,438 | 7/1990 | Burtzlaff et al. | 318/564 |
| 5,019,755 | 5/1991 | Walker | 318/13 |
| 5,029,265 | 7/1991 | Staats | 318/729 |
| 5,266,787 | 11/1993 | Mazz et al. | 235/467 |

Primary Examiner—Robert E. Nappi
Assistant Examiner—Kim Lockett
Attorney, Agent, or Firm—Pauley Petersen Kinne & Fejer

[57] ABSTRACT

A system for operating a plurality of motors with a single controller is disclosed. This system includes a first motor, a second motor that is matched to the first motor but has a lower power rating than the first motor and a controller electrically driving the first and second motors with a modulated voltage at one frequency selected from one or more frequencies over a complete range of frequencies. The controller generates a frequency of the modulated voltage from the range of frequencies which is proportional to the desired speed for the first and second motors. A method for building such a system is also disclosed. This system and method have particular application to HVAC systems.

13 Claims, 2 Drawing Sheets

METHOD AND APPARATUS FOR OPERATING A PLURALITY OF MOTORS WITH A SINGLE CONTROLLER

This application claims benefit of Provisional Appl 60/010,274 filed Jan. 19, 1996.

BACKGROUND OF THE INVENTION

1. Field of the Invention

The present invention relates in general to electric motors and, in particular, to a system in which a single controller is used to control two or more motors. This invention has particular application in HVAC systems.

2. Background Art

As is well-known in the HVAC art, furnaces include a main blower that forces the heated (or cooled) air into the supply duct for distribution throughout a zone (or zones) to be conditioned. Recently, furnaces have been additionally equipped with a second, smaller blower, called an induced draft blower, which draws exhaust gasses out of the furnace. This induced draft blower is matched to the main blower such that these two blowers work in combination to provide efficient conditioning of a particular space.

To further increase efficiency of the HVAC system, it is desirable to run a furnace at various rates (by varying gas supply and motor speed). Traditionally, furnaces were controlled such that they would continue to distribute conditioned air (i.e. heated or cooled) to the desired zone or zones at 100% power, intentionally overshooting the desired temperature, and then shutting down completely until the conditioned zone fell significantly below the desired temperature after which the zone was heated again at 100% power. It has been found, however, that a desired temperature can be more efficiently reached and then maintained by running the furnace at 100% when the temperature of a zone is significantly below the desired temperature and then at 25–60% of its maximum power over a longer period of time to maintain the zone at or about desired temperature. This approach can result in a significant cost-savings to the user, while also providing increased comfort.

This lower power mode allows for and requires a reduced gas input and slower rotation of both the main (circulating) and induced draft blowers to maintain proper furnace operation. This desired adjustability can be easily achieved with today's modern speed controllers, which are available for most motors. Necessarily, however, each controller adds to the cost of its associated motor and, in turn, the overall system into which the motors are installed. Accordingly, it is an object of the present invention to provide a control scheme in which a plurality of associated motors can be controlled by a single controller.

One very popular type of motor in furnaces is the brushless DC permanent magnet motor. Because of its brushless design, these motors require some form of feedback to their associated controller. Normally, this requirement is no problem. However, designing a single controller to accept and combine the feedback of differently-rated DC motors and, in turn, control both of those motors with a common signal would be difficult, at best. It is believed that in such a circuit, drive speed could vary by more than 20%. Thus, standard furnaces, which use brushless DC motors, may present difficulties toward achieving the goal of running a plurality of motors from a single controller.

Accordingly, it is an associated object of the present invention to select a type of motor for use in furnaces that will facilitate the desired objects of the present invention.

These and other objects of the present invention will become apparent to those of ordinary skill in the art in light of the present specification, drawings and claims.

SUMMARY OF THE INVENTION

The present invention comprises a system for operating a plurality of motors with a single controller. The system includes a first motor, a second motor, and controller. The second motor is matched to the first motor and may or may not have a lower power rating than the first motor. The controller electrically drives the first and second motors with a modulated voltage (such as a sine wave or pulse modulated signal) at one set frequency. The controller is capable of generating different frequency signals based upon the desired speed for the first and second motors.

These first and second motors can be of any type of motor and are usually selected to perform work in combination with one another in a set ratio. One particular application is running the fans for a furnace. This system can be installed into a standard furnace with two motors controlled by a single controller by: installing a first motor in the standard furnace, the first motor having a controller; matching a second motor to the first motor; installing the second motor in the standard furnace; connecting the second motor to the controller associated with the first motor; and controlling the first and second motors with the controller associated with the first motor. Where necessary the current from the controller can be limited or boosted such that the desired operating parameters are achieved.

DETAILED DESCRIPTION OF THE DRAWINGS

Figure 1:
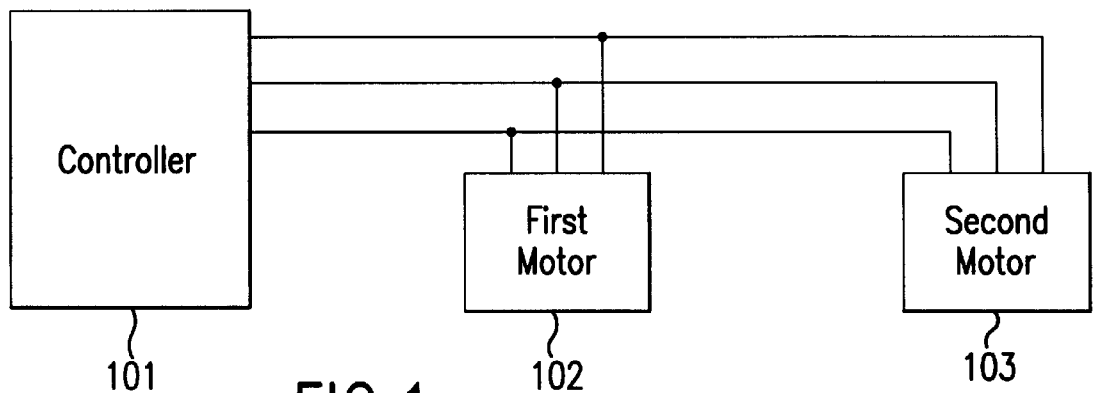
FIG. 1 of the drawings is a schematic block diagram of the system for operating a plurality of motors with a single controller.

While this invention is susceptible of embodiment in many different forms, there is shown in the drawings and will herein be described in detail, a plurality of embodiments with the understanding that the present disclosure is to be considered as an exemplification of the principles of the invention and is not intended to limit the invention to any of the embodiments disclosed herein.

FIG. 1 of the drawings is a schematic block diagram of system 100 for operating a plurality of motors with a single controller. System 100 includes controller 101, first motor 102 and second motor 103. In an embodiment of the present invention, the system further includes relay pairs 105 and 106, which disconnect their associated motor from controller 101, in the event that, that motor's operation is not required. This functionality is achieved by interposing relay 105 between controller 101 and first motor 102 and relay 106 between controller 101 and second motor 102. Controller 101 is electrically connected to both first motor 102 and second motor 103. Although a three-phase power system is shown in FIG. 1, the present invention works equally well in one- and two-phase power systems, as would be readily understood by one of ordinary skill in the art with the present disclosure before them.

Figure 2:
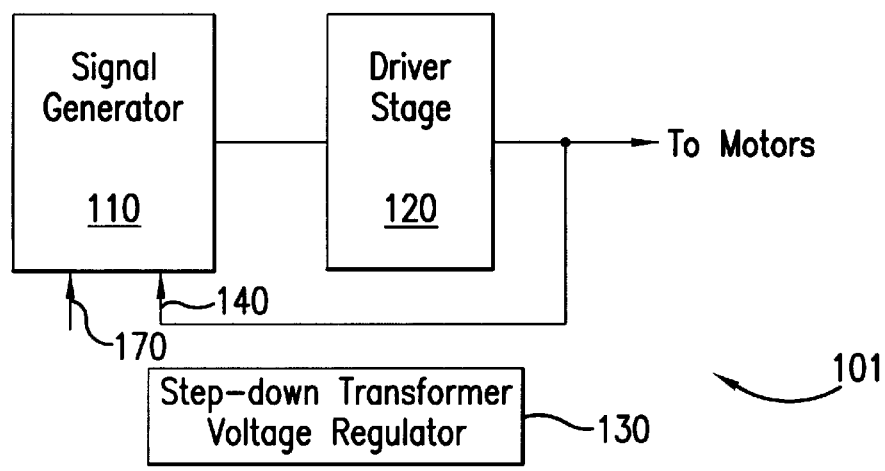
FIG. 2 of the drawings is a schematic block diagram of one possible controller for use in the present system.

Controller 101 generates and provides a constant frequency voltage to drive first motor 102 and second motor 103 at various constant frequencies. While this constant frequency voltage will generally be a sine wave, a pulse width modulated signal and other variable DC signals will also work well. The frequency of this drive voltage is based upon the desired output of the first and second AC motors. As shown in FIG. 2, controller 101 includes speed controller 110 and driver stage 120. In a preferred embodiment, speed controller 110 may generate two- or three-phase power signals which control driver stage 120 to provide a voltage and current at the desired operating range with desired signal characteristics. Controller 101 may additionally include voltage regulator 130 and current sense feedback loop 140. Controller 101 generates a particular modulated (sine-like) signal based on input provided by external control signal 170 such as from a thermostat. Control signal 170 may be an analog voltage, digital signal, pulse width modulated signal or other signal for conveying the control value based on information from any number of apparatuses such as thermostats and operator control panels. Additional control circuitry may be necessary to convert control signal 170 into a readable signal for speed controller 110. Such circuitry and the details associated therewith, would be apparent to one with ordinary skill in the art.

First motor 102 and second motor 103 of FIG. 1 are AC motors of the three-, two- or single- phase type, although two- or three-phase type AC motors are preferred. In the case of AC motors, these motors can be of either the synchronous or induction type. In either event, at their drive frequencies both of these types of AC motors act synchronously. While both motor types work equally well, induction AC motors are more common than synchronous motors. Various types of AC induction motors including the split phase motor, permanent split capacitor motor, capacitor start/capacitor run motor are well known in the art. While these prior art capacitor motors are found in a majority of presently placed HVAC systems, the lower frequencies required for slower motor speeds would cause the capacitor to present higher impedance and the windings to present lower impedance resulting in significantly decreased efficiency of the motor. A co-pending application incorporated herein by reference and assigned to the same entity, discloses removing capacitors from these "capacitor motors" and using the associated controller to directly run both windings of the motor resulting in a two-phase driven motor rather than the signal phase of the original capacitor motors. Thus, in a system using these modified "capacitor motors," the associated controller would have to generate the variable frequency voltages to primary winding required for a variable speed motor, as well as the 90° phase shifted version of the selected variable frequency voltage to secondary winding of these capacitor motors, as disclosed in the co-pending application.

No matter which type of motor is selected, it is important to the proper functioning of the present invention to select first motor 102 and second motor 103 such that they match (i.e. the two motors will run at the same speed, less the slip in rpm required for each to produce the desired torque). The desired result is motor speeds in these motors that track each other. Accordingly, while first motor 102 and second motor 103 could potentially be of different types (single-phase, two-phase, three-phase, synchronous, induction and all the possible derivative discussed hereinabove), selecting identical motor types will simplify the design and ensure appropriate performance of the overall system throughout the entire operating range.

In furnace applications, the first and second motors are both running fans. Consequently, the loads placed thereon are not relatively great, especially at lower rpms. As is well-known in the HVAC art, the power to run a fan is proportional to the cube of the rpm. Thus, reducing the speed in half would require only one eighth the power. Typically, a three phase motor at 1 hp has <4% slip at its rated load, which means it will run at least 1728 rpm. In the case of reduced loads (lower speed), the slip will be even less, thus, allowing the motors to track very closely when driven off a common controller.

Figure 3:
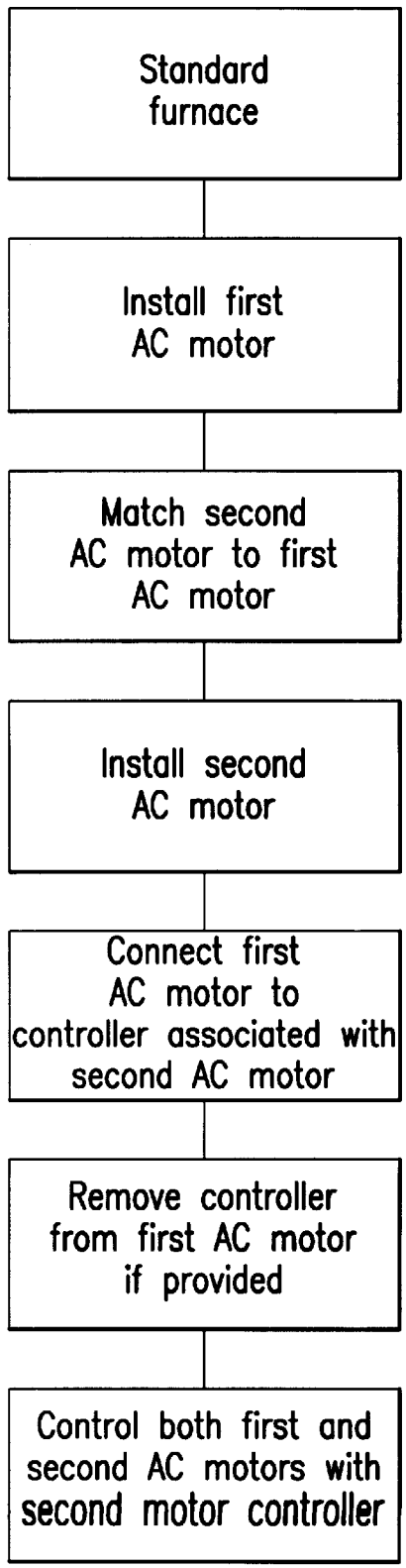
FIG. 3 of the drawings is a flow diagram of the method for constructing a system for operating a plurality of motors with a single controller.

With reference to FIG. 3, starting with a standard furnace, a first motor is installed as the main blower. This first motor will typically be on the order of ¼–1 horsepower and is used to force air throughout the ducts into the zone to be conditioned (not shown). A second motor (on the order of one-twenty-fifth horsepower) is matched to the first motor such that the two motors will run at the same speed, less the slip in rpm required for each motor to produce their respectively desired torque. The second motor is installed in the furnace as the induced draft blower, which removes exhaust gases from the furnace. The second motor is then connected to the speed controller of the first motor and the speed controller on the second motor is removed (or preferably the second motor is manufactured without the controller from the outset). While the cost of the smaller controller on the second AC motor is lower than that for the larger, first AC motor, there is still a cost savings achieved by removing that controller nonetheless. As would be understood to those with ordinary skill in the art, it may be desirable to reverse the power requirements of the two motors—to more accurately control the lower power motor than the higher power motor, when, for example, safety is a primary concern.

As each controller is basically the same, few if any modifications to the control circuit will be necessary. In the case of "slaving" the second motor off of the first motor's controller, only minimal additional circuitry, if any, may be needed such as a current limiting circuit to prevent overloading the second (smaller) motor. As a result of this system fabrication, the system can be run more easily and at a lower overall cost over a variable range of speeds.

The foregoing description and drawings merely explain and illustrate the invention and the invention is not limited thereto except insofar as the appended claims are so limited, as those skilled in the art who have the disclosure before them will be able to make modifications or variations therein without departing from the scope of the invention.

What is claimed is:

1. A system for operating a plurality of motors of a standard furnace with a single controller, said system comprising:

a first motor, wherein the first motor is positioned in the standard furnace so as to force air throughout at least one duct of the standard furnace;

a second motor, wherein the second motor is positioned in the standard furnace so as to remove exhaust gases from the furnace, the second motor being matched to the first motor and having a lower power rating than the first motor, wherein when activated, the second motor and the first motor rotate at substantially the same speed; and a controller supplying the first and second motors in parallel with a single constant frequency voltage signal selected from one or more frequencies over a complete range of frequencies, the frequency of the single constant frequency voltage signal being proportional to a desired speed for both the first and second motors;

wherein the first and second motors perform work at substantially the same speed, when both are activated.

2. The system according to claim 1 wherein the work the first and second motors perform in combination with one another is running the fans for a furnace.

3. The system according to claim 1 wherein the first and second motors are AC motors.

4. A system for operating a plurality of motors of a standard furnace with a single controller, said system comprising:

a first motor, wherein the first motor is positioned in the standard furnace so as to force air throughout at least one duct of the standard furnace;

a second motor, wherein the second motor is positioned in the standard furnace so as to remove exhaust gases from the furnace, the first motor being matched to the second motor and having a lower power rating than the second motor, wherein when activated, the second motor and the first motor rotate at the same speed; and a controller supplying the first and second motors in parallel with a single constant frequency voltage signal selected from one or more frequencies over a complete range of frequencies, the frequency of the single constant frequency voltage signal being proportional to a desired speed for both the first and second motors;

wherein the first and second motors perform work, at the same speed when both are activated.

5. The system according to claim 4 wherein the work the first and second motors perform in combination with one another is running the fans for a furnace.

6. The system according to claim 4 wherein the first and second motors are AC motors.

7. The system according to claim 4 further including a first relay pair interposed between the controller and the first motor to preclude operation of the first motor.

8. The system according to claim 7 further including a second relay pair interposed between the controller and the second motor to preclude operation of the second motor.

9. A method for operating a standard furnace with two motors controlled by a single controller, the method rising:

installing a first motor in the standard furnace, wherein the first motor is used to force air throughout at least one duct of the standard furnace, the first motor having a controller;

matching a second motor to the first motor, wherein when activated, the first motor and the second motor rotate at the same speed;

installing the second motor in the standard furnace, wherein the second motor removes exhaust gases from the furnace, to, in turn, function as an induced draft blower;

connecting the second motor to the controller associated with the first motor;

controlling the first and second motors with the controller associated with the first motor; and limiting the current to the second motor from the controller.

10. The method of claim 9 further comprising the step of precluding operation of the first motor when such operation is unnecessary.

11. The method of claim 10 further comprising the step of precluding operation of the second motor when such operation is unnecessary.

12. A method for operating a standard furnace with two motors controlled by a single controller, the method comprising:

installing a first motor in the standard furnace, wherein the first motor is used to force air throughout at least one duct of the standard furnace, the first motor having a controller;

matching a second motor to the first motor, wherein, when activated, the first motor and the second motor rotate at the same speed;

installing the second motor in the standard furnace, wherein the second motor removes exhaust gases from the furnace, to, in turn, function as an induced draft blower;

connecting the second motor to the controller associated with the first motor;

controlling the first and second motors with the controller associated with the first motor; and precluding operation of the first motor when such operation is unnecessary.

13. The method of claim 12 further comprising the step of precluding operation of the second motor when such operation is unnecessary.

* * * * *